(12) United States Patent
Poulson

(10) Patent No.: US 6,328,917 B1
(45) Date of Patent: Dec. 11, 2001

(54) METHOD FOR MAKING TOOLS FROM THERMOSETTING RESIN AND FILLER COMPOSITIONS

(75) Inventor: Marvin Eugene Poulson, Medford, OR (US)

(73) Assignee: Thermoset Molds, L.L.C., Medford, OR (US)

( * ) Notice: Subject to any disclaimer, the term of this patent is extended or adjusted under 35 U.S.C. 154(b) by 0 days.

(21) Appl. No.: 09/245,099

(22) Filed: Jan. 26, 1999

Related U.S. Application Data

(60) Provisional application No. 60/072,793, filed on Jan. 28, 1998.

(51) Int. Cl.[7] ................................................... B29C 33/40
(52) U.S. Cl. ............................ 264/69; 264/220; 264/225
(58) Field of Search ............................. 264/69, 220, 225, 264/553

(56) References Cited

U.S. PATENT DOCUMENTS

| | | | |
|---|---|---|---|
| 2,836,530 | * | 5/1958 | Rees ..................................... 156/214 |
| 3,839,120 | * | 10/1974 | Kilian .................................. 264/220 |
| 4,285,901 | * | 8/1981 | Yotsutsuji et al. .................... 264/220 |
| 4,764,327 | * | 8/1988 | Nozaki et al. ........................ 264/225 |
| 4,867,662 | * | 9/1989 | Shimahara et al. .................. 264/225 |

\* cited by examiner

*Primary Examiner*—Allan R. Kuhns
(74) *Attorney, Agent, or Firm*—Klarquist Sparkman, LLP

(57) ABSTRACT

A thermosetting resin and filler composition that can be cured in a variety of shapes and dimensions to make a variety of tools is described. One example of a tool that can made is a vacuum-casting mold. One embodiment first involves forming a tool composition comprising (a) from about 65 to about 75 weight percent filler, the filler being selected from the group consisting of Group II metal carbonates, such as calcium carbonate and magnesium carbonate, alumina, silica, ceramic materials, glass, nut shells, fiberglass, dolomite, and mixtures thereof, (b) from about 25 to about 35 weight percent of a thermosetting resin, and (c) a catalyst for catalyzing the formation of the thermoset resin. Once formed, the tool composition is applied to a plug shaped so that the desired tool is formed by curing the composition on, around and/or in the plug. The composition is allowed to cure to form the tool, and the tool is then separated from the plug. The present invention also is directed to a method for forming articles from tools made by the method.

30 Claims, No Drawings

METHOD FOR MAKING TOOLS FROM THERMOSETTING RESIN AND FILLER COMPOSITIONS

CROSS REFERENCE TO RELATED APPLICATION

This application claims priority from applicant's copending provisional application No. 60/072,793, filed on Jan. 28, 1998, which is incorporated herein by reference.

FIELD OF THE INVENTION

This invention concerns thermoset tools, such as molds for making articles by casting or forming processes, methods for manufacturing the tools, and articles made using the tools.

BACKGROUND OF THE INVENTION

The vacuum-casting industry designs tools that function as and makes molds from which additional articles are cast. Molds currently used in the vacuum-casting industry are made by serially applying plural layers of various materials to a master mold. These conventional molds generally have at least one layer, usually the first layer applied to the master mold, made from aluminized gel coats. Aluminized gel coats are relatively quite expensive, typically costing about $11–$12/pound.

After the first layer is applied to the master mold, additional "back up" layers are serially applied by hand over this layer to form a mold. Vacuum-casting methods subject these molds to significant stresses, and the molds therefore must have sufficient structural integrity so that they can withstand these stresses and be useful for their intended purposes. Molds made using conventional technology require a mold wall thickness of at least about 5/16 inch to about 3/8 inch, which thicknesses are achieved by serially applying back up layers to the master mold until the desired mold thickness is obtained. Back up layers for vacuum-casting molds often comprise fiberglass and an aluminized tooling resin. The cost of the materials used to make the back-up layers, while significantly less than that for aluminized gel coats, still is about $5–$6/pound.

Conventional molds used by the vacuum-casting industry have a part production capacity of only about 1,000 parts. That is, the molds must be replaced after about 1,000 parts are made using such molds. Moreover, conventional molds currently used by the vacuum-casting industry have to be repaired after producing only about 75–100 parts. These two factors, the part production capacity of the mold and the need to repair the mold frequently, plus the material costs required to produce conventional vacuum-casting molds, indicate that there is a need for new materials and methods for making various molds useful for practicing vacuum-casting processes.

SUMMARY OF THE INVENTION

The present invention provides a thermosetting resin and filler composition that can be cured in a variety of shapes and dimensions to make a variety of tools. One example, without limitation, of a tool that can made according to the method of the present invention is a vacuum-casting mold. These molds can be made much less expensively, have longer useful lifetimes, such as part production capacities of about 5,000 total parts, and need repairing much less frequently, such as after producing about 1,000 parts, than conventional vacuum-casting molds.

One embodiment of the method for making tools according to the present invention first involves forming a composition useful for making tools, referred to herein as a tool composition. The tool composition comprises (a) from about 65 to about 75 weight percent filler, preferably about 70 weight percent, the filler being selected from the group consisting of Group II metal carbonates, such as calcium carbonate and magnesium carbonate, alumina, silica, ceramic materials, glass, nut shells, fiberglass, dolomite, and mixtures thereof, (b) from about 25 to about 35 weight percent, preferably about 30 weight percent, of a thermosetting resin, and (c) a catalyst for catalyzing the formation of the thermoset resin.

Particularly useful fillers are selected from the group consisting of calcium carbonates, magnesium carbonates, alumina trihydrate, silica, and mixtures thereof. Working embodiments of the tool composition have been formed comprising from about 50 to about 55 weight percent calcium carbonate, from about 35 to about 40 weight percent magnesium carbonate, and less than 2 weight percent silica.

A tool composition made according to the present invention has been found to be particularly suitable for making molds for the vacuum-casting industry. For this embodiment, from about 5 to about 10 weight percent of the filler portion of the composition comprises alumina trihydrate. The remainder of the filler portion is selected from the group consisting of Group II metal carbonates, silica, and mixtures thereof. The alumina trihydrate preferably comprises particles having an average particle size of from about 7 $\mu$m to about 10 $\mu$m, typically about 8 $\mu$m, and the remainder of the filler particles have an average particle size of from about 73 $\mu$m to about 77 $\mu$m, typically about 75 $\mu$m.

Suitable thermosetting resins for practicing the method of the present invention are selected from the group consisting of saturated polyester resins, unsaturated polyester resins, unsaturated polyester copolymer resins, styrene-unsaturated polyester copolymer resins, vinyl ester resins, vinyl ester-styrene copolymer resins, epoxy resins, epoxy-vinyl ester copolymer resins, and mixtures thereof. Preferred thermosetting resins for practicing the method of the present invention are selected from the group consisting of unsaturated polyester resins, styrene-unsaturated polyester copolymer resins, vinyl ester resins, vinyl ester-styrene copolymer resins, and mixtures thereof.

The composition typically comprises from about 1 to about 2 volume percent, based on the volume of the resin, of at least one organic peroxide catalyst. Working tool compositions have included a catalyst selected from the group consisting of methyl ethyl ketone peroxides, 2,4 pentanedione peroxides, cumyl peroxide, and mixtures thereof.

The step of forming the composition has been practiced by adding to a mixing device from about 25 to about 35 weight percent resin and from about 1 to about 2 volume percent catalyst, based on the volume of the resin. The resin and catalyst are added to the mixing device with continuous mixing and mixed for a sufficient period of time to substantially disperse the catalyst throughout the resin, thereby forming a resin-catalyst mixture. The mixing device can be a vacuum mixing device. From about 65 weight percent to about 75 weight percent filler is then added to the mixture, and the mixture and filler are blended.

Once formed, the tool composition is applied to a plug shaped so that the desired tool is formed by curing the composition on, around and/or in the plug. The composition is allowed to cure to form the tool, and the tool is then separated from the plug. The step of applying the composition to the plug has been accomplished by vibrating the plug having the tool composition applied thereto, which helps distribute the tool composition substantially uniformly on, around, about and/or inside the plug as desired.

In one embodiment, the step of allowing the resin to cure was initially practiced at ambient temperature. The method further included a heated curing step and most typically involves heating just the tool, but could involve heating the tool and plug at a temperature of from about 100° F. to about 400° F. for a period of from about 1 hour to about 12 hours after curing the resin at ambient temperature.

The present invention concerns tools that can be used for a variety of purposes, wherein at least a portion of the tool is made using the compositions described briefly above. One embodiment of the tool is useful as a mold for forming articles by vacuum-casting processes.

The present invention also is directed to a method for forming articles from tools. One embodiment of the method comprises first making (or using) a tool shaped in the form of a desired article as described above, and separating the tool from the plug. Articles are then formed, such as by vacuum-casting such articles, using the tool as a mold.

DETAILED DESCRIPTION OF THE PREFERRED EMBODIMENTS

The following definitions are provided solely for the convenience of the reader. These definitions should not be construed to limit the defined terms to a scope less than would be known to a person of ordinary skill in the art.

A "plug" or "master mold" is a structure to which compositions, made as described below for practicing the method of the present invention, are applied. Plugs may be fashioned from a variety of materials, including wood, plaster of paris, polymeric materials the thermosetting resin-filler compositions described below, etc., and mixtures of these materials. Plugs are shaped in the form and have the dimensions of a desired "tool". For example, plugs may be designed to form a structure having an internal void in the shape of a desired article. The compositions of the present invention are introduced into the void, allowed to cure inside the void, and then separated from the plug. Alternatively, the compositions of the present invention may be applied to one or more surfaces of a plug, allowed to cure, and then separated from the plug. Moreover, plugs may be furnished by a particular industry for use in practicing the method of the present invention. It therefore will be appreciated that the plug may be fashioned from a variety of materials into a variety of different shapes having variable dimensions.

A "tool" is the product made by applying the compositions of the present invention to plugs. The compositions are applied, the resin is allowed to cure, and then the tool is separated from the plug. The tool may then be ready to be used directly. Alternatively, the tool might itself function as a device from which further articles can be manufactured having desired shapes and dimensions. For example, the tool might function as a mold from which other articles are cast, particularly by vacuum-forming processes, pressure injection processes, match mold tooling processes, etc.

The present invention concerns compositions and methods for making tools, and articles made using these tools. Method steps used to make tools, and working examples exemplifying these steps in further detail, are described below.

I. Composition for Making Tools

The compositions used to make tools in accordance with the present invention comprise a filler, a thermosetting polymeric resin, and a catalyst for catalyzing the formation of the thermoset material. Compositions formed using these materials in the relative weight percents stated have viscosities of from about 140,000 cps to about 180,000 cps at 77° F.

A. Filler

The tool compositions of the present invention comprise from about 65 to about 75 percent filler based on the total weight of the thermosetting resin and filler used to form the composition (referred to as weight percent), typically from about 68 to about 73 weight percent filler, and preferably about 70 weight percent filler. Fillers that can be used to practice the present invention can be selected, without limitation, from the group consisting of Group II metal carbonates, alumina, silica, ceramic materials, particularly ceramic spheres, glass, particularly glass spheres, nut shells, such as pecan or walnut shell flour, fiberglass, dolomite, and mixtures thereof. The currently preferred filler materials for practicing the method of the present invention are the Group II metal carbonates, alumina, particularly alumina trihydrate, silica, and mixtures thereof.

Particularly suitable Group II metal carbonates include calcium carbonate, magnesium carbonate, and mixtures thereof. For example, working tool compositions have been made using a filler material comprising from about 50 to about 55 weight percent calcium carbonate and from about 35 to about 40 weight percent magnesium carbonate, the balance being other materials, such as silica. An example, without limitation, of a mixed carbonate filler material used to practice the method of the present invention is available from Basins, Inc., of Wheatland, Wyo.

Combinations of Group II metal carbonates and alumina trihydrate have been found to be particularly suitable for forming tools useful as molds for the vacuum-casting industry. Alumina trihydrate provides at least three benefits. First, the water of hydration of alumina trihydrate evaporates during formation of the tool. This evaporation helps control, and may reduce, the exotherm. Controlling and/or reducing the exotherm helps reduce shrink that occurs in the tool. Second, alumina trihydrate particles typically are much smaller than the metal carbonate particles. This facilitates close packing of the filler particles, which also helps reduce shrink. Third, alumina trihydrate has been shown to improve the resistance of tools to thermal shock.

Working tools have been made in accordance with the present invention by maintaining the total amount of the filler content to be from about 65 to about 75 percent of the total weight of the tool composition. But, where combinations of metal carbonates and alumina trihydrate fillers are used, about 5 to about 10 percent of the composition is alumina trihydrate filler. For example, working tool compositions have included from about 58 weight percent to about 69 weight percent of a roughly 60:40 mixture of calcium carbonate and magnesium carbonate having an average particle size of about from about 73 $\mu$m to about 77 $\mu$m, typically about 75 $\mu$m, along with about 10 weight percent alumina trihydrate particles having an average particle size of from about 7 $\mu$m to about 10 $\mu$m, and typically about 8 $\mu$m. The average particle size of the filler may vary from these sizes. But, particle size also may affect the performance of the tool. Smaller alumina trihydrate filler particles facilitate close packing of the filler particles, which in turn minimizes shrink.

An example, without limitation, of a suitable alumina trihydrate material is available from HUBER® Engineered Minerals under the trademark ONYX ELITE® series alumina trihydrate.

B. Resins

The tool composition includes from about 25 to about 35 weight percent of a resin material, particularly a thermosetting resin material, more typically from about 28 to about 32 weight percent resin, and preferably about 30 weight percent thermosetting resin. Thermosetting polyesters, particularly unsaturated polyester polymers, and copolymers thereof, particularly styrene-unsaturated polyester copolymers, thermosetting vinyl esters, including vinyl ester-styrene copolymers, and thermosetting epoxy resins, including epoxy-vinyl ester copolymer resins, can be used to make tools in accordance with the method of the present invention. Currently, preferred resins are selected from the group consisting of unsaturated polyester resins, styrene-unsaturated polyester copolymer resins, vinyl ester resins, vinyl ester-styrene copolymer resins, and mixtures thereof.

An example, without limitation, of a polyester resin proven useful for making tool compositions is commercially available from BP Chemicals under the trademark SILMAR® unsaturated polyester in monomer. SILMAR® resin comprises about 23–35 weight percent styrene monomer, about 65–77 weight percent unsaturated polyester prepolymer resin, and about 0–1.2 percent diallyl phthalate monomer. The physical properties of SILMAR® resin include: boiling point=293° F. (145° C.); specific gravity=1.12 g/cc; and melting point=−0.5° F. (−31.0° C.).

Another example, without limitation, of a polyester resin proven useful for making tools is SIL90BA-1265 polyester resin, which is available from Interplastic Corporation (Vadnais Heights, Minn.). SIL90BA-1265 polyester resin comprises about 29–34 weight percent styrene and about 66–71 weight percent unsaturated polyester resin. The physical properties of SIL90BA-1265 polyester resin include: boiling point=293.4° F. (145° C.); and specific gravity=1.0–1.2 g/cc.

An example, without limitation, of a vinyl ester resin proven useful for making tools is commercially available from Ashland Chemical of Ashland, Oreg., under the trademark HETRON®, including HETRON® FR 990 ZX and HETRON® FR 992 vinyl ester resins. HETRON® FR 990 ZX is a vinyl ester resin. HETRON® FR 992 is a styrenated vinyl ester resin. Vinyl esters have been found to exhibit more thermal stability than unsaturated polyesters, and hence might be preferred for situations where tools are required that are resistant to thermal shock.

C. Catalyst

A catalyst is added to the tool composition to catalyze the formation of the thermoset polymeric material from the monomer resins. A sufficient amount of catalyst is added to cure the thermoset material in a period of time reasonable for commercial production of the tools, and to control the exotherm of the resin-curing process. Currently, suitable results have been obtained using from about 1 to about 2 percent catalyst, and preferably about 1.5 volume percent catalyst, based on the volume of the resin. The weight the catalyst contributes to the total weight of the composition is nominal, and therefore generally is ignored when calculating the relative weight percents of the resin and filler in the tool composition.

Tools in accordance with the present invention have been made using an organic peroxide catalyst or combinations of organic peroxide catalysts. Examples, without limitation, of suitable organic peroxide catalysts include methyl ethyl ketone peroxides (MEKP), 2,4-pentanedione peroxides, such as AZOX initiator from the Norac Company, Inc. of Azusa, Calif., cumyl hydroperoxide, and mixtures thereof. An approximately 9 percent solution of methyl ethyl ketone peroxide has been used to form tools. But, the exotherm experienced when tools were made using this catalyst was about 270° F. to about 295° F., which is a relatively high exotherm that may cause additional tool shrink. Nevertheless, a solution of methyl ethyl ketone peroxide can be used to catalyze the resin-curing reaction for some applications.

Mixtures of organic peroxides have been found to reduce the exotherm to about 80° F.–105° F., with a target value of about 90° F., which in turn helps reduce the amount of shrink experienced. One example of a suitable mixture of organic peroxide catalysts is commercially available as NOROX® MCP from The Norac Company, Inc., Azusa, Calif. NOROX® MCP comprises a mixture of methyl ethyl ketone peroxides and cumyl hydroperoxide, is particularly useful as a polymerization initiator for the room temperature cure of polyester resins, and provides an exotherm of about 90° F. when used at about 1 volume percent to about 2 volume percent with respect to the resin.

II. Forming the Composition for Making Tools

A mixture of the materials discussed above typically is formed with continuous mixing using a mixing device. The thermosetting resin, having a viscosity in the range of from about 1,400 cps to about 3,000 cps, with a target value of about 2,700 cps, is added to the mixing device first, followed by the catalyst. After addition of the catalyst to the resin, the resin and catalyst are mixed for a sufficient period of time, e.g., about 3 minutes, to substantially uniformly distribute the catalyst throughout the thermosetting resin. The filler is added to the mixture of resin and catalyst, with continued stirring. The composition comprising the resin, catalyst and filler is then mixed in the mixing device for a sufficient period of time to substantially uniformly distribute the filler throughout the resin material, which takes from about 3 to about 5 minutes. The compositions made in this fashion are relatively viscous, and have typical viscosities of from about 140,000 cps to about 180,000 cps at 77° F.

The mixing step also can be done under a vacuum. Thus, mixing devices to which vacuum pumps can be attached can be used to practice the invention. Mixing under vacuum helps remove air that may be entrapped in the tool composition. Removing the air further reduces the shrink in the tool.

The working examples provide further detail concerning how to make the tool compositions of the present invention.

III. Applying the Composition Substantially Uniformly to a Plug

Compositions made as described above and in the working examples are then applied to a plug. Release agents may be used to help separate the tool from the plug after the composition has cured. Typical release agents include wax and talc. If a release agent is used, it is applied first to the plug, followed by the compositions of the present invention.

A particularly useful method for applying tool compositions to plugs is to first apply the relatively viscous tool composition to regions of the plug. The plug is then vibrated, such as by using a vibrating table, to distribute the composition substantially uniformly over the surface or inside the cavity of the plug. Vibration has been accomplished using both air and electric vibrators. Typical impact force capabilities of suitable vibrators are from about 50 to about 450 pounds impact force depending on the size of the plug. If, for example, only 5 pounds of tool composition are required for a particular plug, then perhaps the vibration needed to release the entrapped air would be as little as 50 pounds applied force. But, if 200 pounds of tool composition are required, then the vibration needed might be as high as 450 pounds applied force to release entrapped air and distribute the tool composition around, about and/or in the plug substantially uniformly.

If the plug is a structure defining a cavity into which tool composition is introduced to form the tool, the volume of the void can be decreased by first suspending a core inside the void. Tool composition is thereafter solidified around the core and inside of the plug. This method advantageously can be used as another means to control shrink. For example, working tools have been made by suspending a cured core of the tool composition inside the plug, and thereafter curing an additional amount of the tool composition inside the plug and around and about the core to reduce the amount of shrink experienced relative to tools made without solidifying tool composition around and about a presolidified core. Other materials also can be used to form the core, including wood, foam, such as a high-density urethane, cardboard, plaster of paris, thermoset resins, thermoset resin with fillers, such as wood fibers, tool compositions of the present invention, and mixtures thereof.

IV. Curing the Composition and Separating the Cured Tool from the Plug

After the tool composition is applied to the plug, it is then allowed to cure. Initial curing times when practicing the method of the present invention have been about 4 hours. However, after this initial curing period the tools typically are subjected to a heated curing step. One reason for this is that the exotherm of the resin-curing reaction likely is only from about 80° F. to about 105° F. for those applications where tool shrink is a significant consideration. This relatively low exotherm may mean that the tool has not completely cured after the first initial curing stage of about 4 hours.

The heated curing step preferably is done solely on the tool after it is separated from the plug, but also can be done before the tool is separated from the plug. The tool can be removed from the plug, if release agents have been used, simply by tapping and shaking the plug. Suction devices also can be attached to the tool to help pull it from the plug.

The heated curing step may be accomplished at various temperatures and for various times. To date, tools have been heated in heated curing steps at 120° F. for 12 hours, 310° F. for 2 hours, and 420° F. for one hour. It currently is believed that the temperature to which the tools are subjected has little effect on the performance of the tool, as long as the tool is substantially completely cured by the initial curing step and the heated curing step. Moreover, the heating temperature should be as high as possible to expedite production, and likely should be at least as high as the temperature to which the tool will be subjected when the tool is used in an appropriate manner to achieve the tool's intended purpose. Currently, most tools have been made using a heated curing temperature of about 120° F. The post-cure heating time has been about 12 hours at 120° F.

V. Miscellaneous Final Processing Steps

After the tool is removed from the plug, it then may be ready for use in its as-separated state. Alternatively, the tool may be subjected to certain post-curing processing steps. For example, surface imperfections can be removed by sanding. Working embodiments of molds made in accordance with the present invention have been sanded effectively using 600 grit sandpaper.

Moreover, certain final processing steps may be implemented to use the tools in a particular industry. For example, vacuum-casting processes may place tools on a vacuum table having vacuum ducts that register with vacuum ducts placed at appropriate locations on the tool. These vacuum ducts of the tool may be drilled into the tool by vacuum-casting personnel.

VI. Shrink

As alluded to above, one characteristic of tools made using resin materials is "shrink" that occurs in the tool's dimensions as the resin material cures. Shrink generally is quantified with respect to the amount a dimension of the tool decreases per inch of the tool. For example, the vacuum-forming industry often desires that tools made as molds for forming articles experience shrink during production of only about 0.001–0.002 inch/inch of tool This has proved difficult to achieve with conventional technology.

The amount of shrink increases as the percent styrene in resins used to make the tool increases. But, other factors must be considered to make tools in accordance with the method of the present invention, including the viscosity of the composition (which affects how easily the material is applied to a plug and the amount of shrink experienced), and how efficiently entrapped gases are released from the composition as it cures. Gases, particularly air, become entrapped in the composition as it is mixed. Entrapped air can cause imperfections in the interior of the composition, particularly if vibration is not employed. Entrapped air that is not released from the surface of the tool during vibration also may cause surface imperfections in the tool, which may require further manufacturing steps to eradicate, such as surface sanding. More viscous compositions generally produce less shrink, but also release air less efficiently than less viscous compositions. The styrene content and viscosity of the composition within the range of from about 140,000 cps to about 180,000 cps at 77° F. therefore can be adjusted to provide both for the efficient release of gas from the composition and to minimize the shrink experienced with a particular composition.

Surprisingly, alumina trihydrate can be used as a filler material to reduce the amount of shrink experienced during formation of the tools. The relatively small average particle size of the alumina trihydrate particles, and evaporation of the water of hydration of alumina trihydrate, currently are believed to account for the reduction in shrink.

The following examples are intended to illustrate certain particular features of the present invention, including how to make tool compositions for practicing the present invention. The invention should not be limited to the particular features exemplified.

EXAMPLE 1

This example describes the formation of a currently preferred composition that has been used to make tools useful as molds for forming articles by vacuum-forming processes. A low-shear blade mixing device was used to provide continuous mixing. About 30 weight percent of a styrenated-unsaturated polyester resin, based on the total weight of all materials added to form the tool composition, was added to the mixing device. The styrenated-unsaturated polyester resin comprised about 23–35 weight percent styrene monomer, about 65–77 weight percent unsaturated polyester prepolymer resin, and about 0–1.2 percent diallyl phthalate monomer. 1.5 volume percent of a mixed organic peroxide catalyst comprising a mixture of methyl ethyl ketone peroxides and cumyl hydroperoxide was added to the mixing device with stirring. Stirring was continued for a sufficient period of time to provide substantially uniform distribution of the catalyst throughout the resin material, which typically required about 3 minutes.

Filler material was added to the mixture of the resin and catalyst with continued stirring. The filler material comprised about 60 weight percent of a mixture of calcium carbonate and magnesium carbonate and about 10 weight percent alumina trihydrate. The mixture of carbonate fillers comprised from about 50 to about 55 weight percent calcium carbonate and from about 35 to about 40 weight percent magnesium carbonate, the carbonate fillers having an average particle size of about 75–77 μm. The alumina trihydrate filler had an average particle size of about 8 μm. Stirring was continued for a sufficient period of time to provide substantially uniform distribution of the filler material throughout the resin/catalyst mixture, which typically required about 3 to about 5 minutes. This composition was then ready for making tools useful for forming articles, such as by vacuum-casting processes.

EXAMPLE 2

This example describes the formation of another composition that has been used to make tools. A mixing device capable of providing continuous mixing and holding all materials used to form the tool composition was provided. About 25 weight percent unsaturated polyester resin, based on the total weight of all materials added to form the tool composition, was added to the mixing device. The unsaturated polyester resin comprised about 23–35 weight percent styrene monomer, about 65–77 weight percent unsaturated polyester prepolymer resin, and about 0–1.2 percent diallyl phthalate monomer. 1.5 volume percent, based on the volume of the resin, of a mixed organic peroxide catalyst comprising a mixture of methyl ethyl ketone peroxides and cumyl hydroperoxide was added to the mixing device with continued stirring. The stirring was continued for a period of about 3 minutes.

75 weight percent filler material was added to the mixture of the resin and catalyst with continued stirring. The filler comprised about 58.3% calcium carbonate, about 40.5% magnesium carbonate and less than 2 percent silica. The filler had a mean particle size of about 75 μm. Stirring was continued for a period of time of about 3–5 minutes, which was sufficient to provide a substantially uniform distribution of the filler material throughout the resin/catalyst mixture. This composition was then ready for making tools.

EXAMPLE 3

This example describes the formation of still another composition useful for forming tools. A mixing device capable of providing continuous mixing and holding all materials used to form the tool composition was provided. About 25 weight percent vinyl resin, based on the total weight of all materials added to form the tool composition, was added to the mixing device. The vinyl resin used was either HETRON® FR 990 ZX, a vinyl ester resin, or HETRON® FR 992, a styrenated vinyl ester resin. 1.5 volume percent, based on the volume of the resin, of a mixed organic peroxide catalyst comprising a mixture of methyl ethyl ketone peroxides and cumyl hydroperoxide was added to the mixing device with continued stirring. Stirring was continued for a period of about 3 minutes.

Filler was added to the mixture of the resin and catalyst with continued stirring. The filler comprised about 65 weight percent of a mixture of calcium carbonate and magnesium carbonate and about 10 weight percent alumina trihydrate. The mixture of carbonate fillers comprised from about 50 to about 55 weight percent calcium carbonate and from about 35 to about 40 weight percent magnesium carbonate, the carbonate fillers having an average particle size of about 75–77 μm. The alumina trihydrate filler had an average particle size of about 8 μm. Stirring was continued for a period of time of about 3–5 minutes, which was sufficient to provide substantially uniform distribution of the filler material throughout the resin/catalyst mixture. This composition was then ready for making tools useful for forming articles by vacuum-forming processes.

EXAMPLE 4

This example describes how to make tools using the tool compositions described above. A plug in the shape of an automobile wind deflector was provided by the manufacturer of the wind deflector. The plug was made from fiberglass and gel coat, and had a wood structural frame. A high-temperature paste wax was applied by hand to the plug.

Tool composition was made as described in Example 1. The plug was situated on a vibratory table and portions of the tool composition were applied to various locations of the plug over the wax release agent until the total amount of tool composition used to made the tool had been applied. The plug was vibrated for about 4 minutes using the vibratory table until the tool composition was substantially uniformly distributed appropriately on the plug. The tool composition and plug were then set aside at a level position and at room temperature for an initial curing period of about 4 hours. The tool was then separated from the plug. The initially-cured tool was then placed in a heat tunnel heated to a temperature of about 120° F., where it remained for about 12 hours. The tool was then separated from the plug and shipped to the manufacturer of the wind deflector. The wind-deflector manufacturer drilled vacuum ducts into the tool, and thereafter used the tool as a mold to cast wind deflectors.

EXAMPLE 5

This example concerns the formation of a wind deflector mold as described in Example 4. However, for this example the heated curing step was conducted at 310° F. for two hours.

EXAMPLE 6

This example concerns the formation of a wind deflector mold as described in Example 4. However, for this example the heated curing step was conducted at 420° F. for one hour.

The molds made as described in Examples 4–6 were compared to assess shrink and other physical characteristics. No significant differences were observed between the molds made by these differing methods. As a result, it appears that the heated curing step can be conducted at various temperatures at least as low as about 120° F. and up to at least as high as about 420° F. and still make tools that perform satisfactorily.

EXAMPLE 7

This example is directed to the formation of a wind deflector mold as described in Example 4. However, for this example a solid core was suspended inside the plug before tool composition was around and about the core. This was done to assess what affect this "core" method might have on tool production.

A plug in the shape of an automobile wind deflector was provided by the manufacturer of the wind deflector A roughly spherically shaped core was formed from the mold composition of Example 1, and allowed to cure. The cured solid core occupied about ⅔ percent of a cavity defined by the plug. The solid core was suspended in approximately a central position inside the cavity.

Tool composition was made as described above in Example 1. This tool composition was then placed in the plug cavity and allowed to cure around and about the core. The initial curing time was 4 hours. The tool was then separated from the plug. Thereafter, the tool was placed in a heat tunnel heated to a temperature of about 120° F. The tool was heated for 12 hours in the heat tunnel and thereafter allowed to cool to room temperature.

The shrink experienced by tools made as described above in Example 4 was then compared to the shrink experienced by tools made as described in this Example 7. Shrink for the tool made as discussed in Example 4 was measured to be about 0.004 inch/inch of tool. Surprisingly, the shrink experienced by the tool produced as described in this Example 7 was only about 0.0008 inch/inch of tool (and only 0.0013 inch/inch of tool after the heated curing step)! This is well within industry standards. Moreover, this represents a significant improvement in the reducing shrink relative to the shrink experienced with tools conventionally used by the vacuum-casting industry.

The dimensional stability of tools made as described in Examples 4–7 also has been evaluated. For example, tools have been heated to 420° F. for one hour, and then reinserted into the plug. This was done to make sure that the tools maintained their required dimensions even when subjected to the high temperatures experienced during typical vacuum-casting processes. Tools made as described herein all maintained their required dimensions, even after being subjected to elevated temperatures for extended periods of time.

Tools made in accordance with the present invention can also be made less expensively and can provide a longer useful life than conventional tools currently being used, particularly by the vacuum-casting industry. For example, it has been estimated that most tools currently being used by the vacuum-casting industry as molds for the production of articles must be repaired after about 75–100 articles have been cast using the tool. Conventional tools also must be completely discarded and new ones used after making a total of only about 1,000 articles. In contrast, tools made in accordance with the present invention likely can be used to make up to about 1,000 articles without requiring repair, and can likely make 5,000 articles before needing to be replaced.

EXAMPLE 8

This example describes how to make tools using the tool compositions described above. A biscuit-shaped test plug was made from the tool composition. A high-temperature paste wax release agent was applied by hand to the surface of the plug that contacted the tool composition while the tool composition cured.

A tool composition made as described in Example 1 was mixed and was then applied to the plug and over the wax release agent. Portions of the tool composition were applied to various locations on the plug until the total amount of tool composition used to made the tool was applied. The plug with applied tool composition was situated on a vibratory table and vibrated for about 4–5 minutes until the tool composition was substantially uniformly distributed appropriately on the plug. The plug with tool composition applied thereto was set aside at a level position and at room temperature for an initial curing time of about 4 hours. The tool was then separated from the plug. The initially-cured tool was placed in a heat tunnel heated to a temperature of about 120° F. for about 12 hours, and then allowed to cool.

Visual inspection of the tool made as described in this Example 8 revealed surface defects that were initially attributed to the release of entrapped air from the composition and water from the alumina trihydrate filler. Although the surface defects could be rectified by post-curing processing steps, it was determined that the surface defects might also be minimized by removing alumina trihydrate, as discussed in Example 9.

EXAMPLE 9

This example describes how to make tools using the tool compositions described above. A biscuit-shaped test plug was made as described in Example 8. A tool composition made as described in Example 2 was then mixed and applied to the plug and over the wax release agent Portions of the tool composition were applied to various locations on the plug until the total amount of tool composition used to made the tool had been used. The plug with applied tool composition was situated on a vibratory table and vibrated for about 4–5 minutes until the tool composition was substantially uniformly distributed appropriately on the plug.

The tool composition and the plug were then set aside at a level position and at room temperature for an initial curing time of about 4 hours, and the tool was then separated from the plug. The initially-cured tool was then placed in a heat tunnel heated to a temperature of about 120° F. for about 12 hours. The tool was allowed to cool to room temperature.

Visual inspection of the tool made as described in this Example 9 revealed that it had a substantially reduced number of surface defects relative to tools made as described above in Example 8. This indicated generally that alumina trihydrate preferably should be used as a filler material where shrink and controlled exotherm considerations outweigh surface defect considerations, and that alumina trihydrate preferably should not be used if surface properties of the tool outweigh shrink and exotherm considerations.

The present invention has been described with respect to certain preferred embodiments. However, the present invention should not be limited to the particular features described. Instead, the scope of the invention should be determined by the following claims.

What is claimed is:

1. A method for forming a tool, comprising:

forming a composition comprising (a) from about 65 to about 75 weight percent of a filler selected from the group consisting of Group II metal carbonates, alumina, silica, and other ceramic materials, glass, nut shells, fiberglass, dolomite, and other Group II mixed metal carbonates, and mixtures thereof, (b) from about 25 to about 35 weight percent of a thermosetting resin, and (c) a catalyst;

applying the composition to a plug shaped like the tool;

vibrating the plug to apply the mixture substantially uniformly to the plug;

allowing the thermosetting resin to cure to form the tool; and separating the tool from the plug.

2. The method according to claim 1 wherein the filler is selected from the group consisting of Group II metal carbonates, alumina trihydrate, silica, and mixtures thereof.

3. The method according to claim 2 wherein the composition comprises about 75 weight percent filler.

4. The method according to claim 2 wherein the thermosetting resin is selected from the group consisting of thermosetting polyester resins, thermosetting vinyl ester resins, thermosetting epoxy resins, and mixtures thereof.

5. The method according to claim 4, wherein the thermosetting polyester resin is a thermosetting unsaturated polyester resin or a thermosetting unsaturated polyester copolymer resin.

6. The method according to claim 5, wherein the thermosetting unsaturated polyester copolymer resin is a styrenated-unsaturated polyester copolymer resin.

7. The method according to claim 4, wherein the thermosetting vinyl ester resin is a thermosetting vinyl ester-styrene copolymer resin.

8. The method according to claim 4, wherein the thermosetting epoxy resin is a thermosetting epoxy-vinyl ester copolymer resin.

9. The method according to claim 1 wherein the filler comprises:

from about 50–55 weight percent calcium carbonate;

from about 35–40 weight percent magnesium carbonate; and less than 2 weight percent silica.

10. The method according to claim 1 wherein a filler portion of the composition comprises a mixture of fillers, from about 5 to about 10 weight percent of the filler portion comprising alumina trihydrate, the remainder of the filler portion being selected from the group consisting of Group II metal carbonates, silica, and mixtures thereof.

11. The method according to claim 10 wherein the remainder of the filler portion comprises from about 50–55 weight percent calcium carbonate, from about 35–40 weight percent magnesium carbonate, and less than 2 weight percent silica.

12. The method according to claim 11 wherein the alumina filler comprises alumina particles having an average particle size of about 8 µm, and the remainder of the filler comprises filler particles having an average particle size of about 75–77 µm.

13. The method according to claim 1 wherein the composition comprises from about 1 to about 2 volume percent, based on the volume of the resin, of at least one organic peroxide catalyst.

14. The method according to claim 1 wherein the catalyst is selected from the group consisting of methyl ethyl ketone peroxides, cumyl peroxide, and mixtures thereof.

15. The method according to claim 1 wherein the step of forming a composition comprises:

adding to a mixing device about 30 weight percent resin and from about 1 to about 2 volume percent catalyst, based on the volume of the resin;

mixing the resin and the catalyst for a sufficient period of time to substantially disperse the catalyst throughout the resin, thereby forming a resin-catalyst mixture;

adding about 70 weight percent filler to the mixture; and blending the mixture and the filler.

16. The method according to claim 1 wherein the step of allowing the resin to cure is practiced at ambient temperature, and wherein the method further includes heating the tool at a temperature of from about 100° F. to about 400° F. for a period of from about 1 hour to about 12 hours after curing the resin at ambient temperature.

17. A method for forming a tool useful as a mold for forming products by vacuum-casting processes, comprising:

forming a composition comprising from about 65 to about 75 weight percent of filler selected from the group consisting of calcium carbonate, magnesium carbonate, silica, alumina trihydrate, and mixtures thereof, from about 25 to about 35 weight percent of a thermosetting resin selected from the group consisting of saturated polyesters resins, unsaturated polyester resins, saturated and unsaturated polyester copolymer resins, vinyl ester resins, vinyl ester-styrene copolymer resins, epoxy resins, epoxy-vinyl ester copolymer resins, and mixtures thereof, and an organic peroxide catalyst or catalysts;

placing the composition in a plug;

allowing the resin to cure; and separating the tool from the plug.

18. The method according to claim 17 wherein the thermosetting resin is selected from the group consisting of styrenated-unsaturated polyester copolymer resins, and mixtures thereof.

19. The method according to claim 17 wherein the step of allowing the resin to cure is practiced at ambient temperature for at least about 4 hours, and the method further comprises curing the tool at a temperature of from about 100° F. to about 400° F.

20. The method according to claim 19 and including curing the tool at a temperature of about 120° F. for a period of about 12 hours.

21. The method according to claim 17 wherein the composition comprises about 75 weight percent filler.

22. The method according to claim 17 wherein the filler of the composition comprises:

from about 50 to about 55 weight percent calcium carbonate;

from about 35 to about 40 weight percent magnesium carbonate; and less than 2 percent silica.

23. The method according to claim 17 wherein the catalyst is selected from the group consisting of methyl ethyl ketone peroxide, cumyl peroxide, and mixtures thereof.

24. The method according to claim 17 wherein the filler comprises Group II metal carbonate filler particles having an average particle size of from about 75 to about 77 µm.

25. The method according to claim 24 wherein the filler further comprises alumina trihydrate particles having an average particle size of from about 7 to about 10 µm.

26. A method for forming a tool, comprising:

forming a composition consisting essentially of from about 65 to about 75 weight percent of a filler selected from the group consisting of Group II metal carbonates, alumina trihydrate, silica, and mixtures thereof, from about 25 to about 35 weight percent of a styrenated-unsaturated polyester resin, and from about 1 to about 2 volume percent, based on the volume of the resin, of an organic peroxide catalyst selected from the group consisting of methyl ethyl ketone peroxides, cumyl peroxide, and mixtures thereof;

optionally applying a mold release agent to a plug;

applying the composition to the plug;

vibrating the plug for a period of time sufficient to distribute the composition substantially uniformly over and/or inside the plug;

curing the composition at ambient temperature;

heating the composition and the plug to a temperature of from about 100° F. to about 400° F. for a period of time from about 1 to about 12 hours to form a tool; and separating the tool from the plug.

27. The method according to claim 26 wherein the filler comprises Group II metal carbonate filler particles having an average particle size of from about 75 to about 77 μm.

28. The method according to claim 27 wherein the filler further comprises alumina trihydrate particles having an average particle size of from about 7 to about 10 μm.

29. A method for forming a tool, comprising:

forming a tool composition by (a) adding to a mixing device from about 28 to about 32 weight percent of a thermosetting resin selected from the group consisting of saturated polyesters resins, unsaturated polyester resins, styrenated-unsaturated polyester copolymer resins, vinyl ester resins, vinyl ester-styrene copolymer resins, and mixtures thereof, and from about 1 to about 2 volume percent of an organic peroxide catalyst or catalysts, (b) mixing the resin and the catalyst for a sufficient period of time to substantially disperse the catalyst throughout the resin, thereby forming a resin-catalyst mixture, and (c) adding from 68 to about 72 weight percent filler to the mixture, the filler being selected from the group consisting of Group II metal carbonates, alumina, silica, and mixtures thereof, and (d) blending the mixture and the filler;

applying the composition to a plug;

vibrating the plug to distribute the composition substantially uniformly over and/or inside the plug;

curing the composition at ambient temperature to form a tool;

heating the tool and the plug to a temperature of from about 100° F. to about 400° F. for a period of time of from about 1 hour to about 12 hours; and separating the tool from the plug.

30. The method according to claim 29 wherein the composition comprises a filler portion, the filler portion comprising from about 5 to about 10 weight percent alumina trihydrate, the remainder of the filler portion comprising from about 50 to about 55 weight percent calcium carbonate, from about 35 to about 40 weight percent magnesium carbonate, and less than 2 percent silica, about 25 weight percent resin, and from about 1 to about 2 volume percent of an organic peroxide catalyst selected from the group consisting of methyl ethyl ketone peroxides, cumyl peroxide, and mixtures thereof.

* * * * *